United States Patent [19]

Tabor

[11] Patent Number: 5,026,586

[45] Date of Patent: Jun. 25, 1991

[54] HEADLINER SHELL FOR VEHICLES

[76] Inventor: Thomas E. Tabor, 1396-A W. Thibodaux By-Pass, Thibodaux, La. 70301

[21] Appl. No.: 334,356

[22] Filed: Apr. 7, 1989

[51] Int. Cl.$^5$ .................. B32B 7/00; B32B 15/00; D03D 9/00; D04D 1/00

[52] U.S. Cl. .................................. 428/90; 428/95; 428/91; 428/186; 428/247; 428/317.9; 428/309.9; 428/214; 428/68; 428/72; 428/76; 428/138; 428/256; 296/214

[58] Field of Search ............... 428/256, 95, 91, 186, 428/247, 256, 317.9, 309.9, 68, 72, 76, 138, 90; 296/214

[56] References Cited

U.S. PATENT DOCUMENTS

| | | | |
|---|---|---|---|
| 3,697,126 | 10/1972 | Tiffin et al. ................... | 296/137 |
| 4,096,304 | 6/1978 | Greengrass ...................... | 428/256 |
| 4,479,992 | 10/1984 | Haeseker et al. ................ | 428/116 |
| 4,886,696 | 12/1989 | Bainbridge ...................... | 428/186 |

*Primary Examiner*—George F. Lesmes
*Assistant Examiner*—Richard C. Weissberger
*Attorney, Agent, or Firm*—John F. Sieberth

[57] ABSTRACT

The shell, which is size and contoured to fit the underside of the roof of the vehicle, is composed of a core of relatively rigid wire mesh embedded in and tightly bonded to a void-free unitary layer of a relatively rigid plastic material enveloping the wire mesh. One type of vehicle headliners have a foam backed cloth or a foam backed plastic film bonded to the side of the shell which will face toward the interior of the vehicle. In a preferred type of vehicle headliners a velour-like coating of short fibers (most preferably nylon fibers) is affixed to and projects from the vehicular interior side of the shell.

12 Claims, No Drawings

HEADLINER SHELL FOR VEHICLES

TECHNICAL FIELD

This invention relates to new and improved headliner shells for vehicles, especially automobiles.

BACKGROUND

Foam headliners for vehicles have previously been described which comprise a wire mesh support sandwiched between two laminated layers of cross-linked ethylene or propylene homopolymer or copolymer foam, one layer being thicker than the other. A composite of a polyvinyl chloride homopolymer or copolymer foam and a decorative solid polyvinyl chloride homopolymer or copolymer film layer is laminated to the thick layer of cross-linked foam.

While headliners of this type have been used, such constructions were not entirely satisfactory—they were found to possess significant operational deficiencies. One such deficiency was the fact that as received from the factory, the interior decorative layer, whether cloth or plastic, had a ⅛, ¼ or ⅜ inch layer of foam glued to its reverse side, which in turn was glued to the headliner. In time this foam deteriorated and as a consequence, the interior decorative layer tended to come loose and sag downwardly from the roof of the vehicle. Attempts to repair the headliner were frustrated by the fact that the headliner had to be removed from the vehicle and stripped of the decorative layer and foam backing so that a new decorative covering could be applied. Unfortunately, the foam sandwiched wire mesh could not readily be cleaned to present a fresh smooth surface to which a fresh decorative layer could be attached. Instead, if solvents were used to clean off the surface, they softened and dissolved away the foam leaving an unsatisfactory surface for application of a new decorative layer. Attempts to prepare a fresh surface by means of a wire brush likewise failed due to the damage to the foam inflicted by the brush. And when it was attempted to simply glue a new decorative covering on top of the original foam layer, the newly applied adhesive interacted with the original adhesive remaining on the foam surface so that the covering would not stick to the foam. Moreover, the two adhesives formed an unsightly, unworkable mess on the headliner such that the headliner was not reusable.

Subsequently, the large automakers turned to other headliner constructions. One large car maker has utilized an unreinforced cardboard or cardboard-like headliner form or shape to which is bonded on the interior side of the vehicle a foam-backed cloth. Bonding between the foam-backed cloth and the headliner form or shape is effected by means of an adhesive. The resultant headliner is held in place by the interior molding and dome light fixture in the vehicle. However, after a few years the cardboard warps and sags out of shape. Another large car manufacturer has resorted to use of headliners composed of foam-backed cloth adhesively bonded to a form or shape of unreinforced foamed polystyrene as the headliner, this also being held in place by the interior molding and the dome light fixture. But after a few years the foamed polystyrene becomes embrittled and cracks when attempts are made to remove the headliner from the vehicle. Another large car manufacturer uses pressed fiberglass in the fabrication of vehicular headliners both as a reinforcing material and as an insulating material. Unfortunately, after a few years the fiberglass layer comes apart and the liner is no longer usable. Thus while these various approaches are satisfactory the outset, in most cases when deterioration set in the only recourse is to remove and throw away the entire headliner and install a new one.

A desirable contribution to the art would be a headliner construction in which the foregoing deficiencies and operational problems are at least minimized if not avoided, in a simple, economical and efficacious manner. It is believed that this invention constitutes such a contribution.

The Invention

In accordance with this invention new and improved reinforced headliner shells and reinforced finished headliner constructions are provided. Among the advantages of the reinforced headliner shells are the following:

No foam is utilized in the shell structure.

Difficulties caused by deterioration of the shell are eliminated; the shell does not crack or come apart on again.

The shell is substantially rigid and thus holds its shape.

Interior finishes such as foam backed cloth and foam backed plastic films are not necessary, but can readily be applied to the shell, if desired.

Foam backed cloth and foam backed plastic film in which the foam has deteriorated can readily be removed from the shell, the interior surface of the shell can readily be cleaned without damage to the shell, and if desired, a fresh interior finish can be applied to the cleaned shell.

The shell or the finished headliner (as the case may be) can be removed from and reinstalled in the vehicle easily and quickly.

Other plush, rich-looking interior finishes devoid of foam and the problems associated with foam deterioration can readily be applied to the shell.

The shell may be fabricated quite inexpensively from readily available materials using readily available fabrication technology.

The shell or the finished headliner (as the case may be) can be held in place against the underside of the roof by conventional means such as interior molding and dome light fixtures, and/or other fasteners.

The reinforcement utilized in the shell can contribute to safety in the event of an accident involving damage to the roof of the vehicle.

In one of its forms this invention provides a substantially rigid vehicle headliner shell of the approximate size and contour of the underside of the roof of the vehicle, said shell comprising a core of substantially rigid wire mesh embedded in and tightly bonded to an essentially void-free unitary layer of a relatively rigid plastic material enveloping said wire mesh. As used herein the term "enveloping" is used in the sense that tat least both sides (faces) of the wire mesh are covered by the unitary layer of plastic material—the ends and/or sides of the wire mesh may be, but need not be, covered in whole or in part by the same unitary layer of plastic material. In short, the wire mesh may be, but need not be, completely encased by the layer of plastic material.

Another embodiment of this invention involves a finished headliner comprises of a substantially rigid headliner shell of the type described in the immediately preceding paragraph to which is bonded on the side thereof adapted to face toward the interior of the vehicle, a foam backed cloth or a foam backed plastic film.

A particularly preferred embodiment of this invention is a finished headliner with comprises (i) a substantially rigid vehicle headliner shell of the approximate size and contour of the underside of the roof of the vehicle, said shell comprising a core of substantially rigid wire mesh embedded in and tightly bonded to an essentially void-free unitary layer of a relatively rigid plastic material enveloping said wire mesh; and (ii) a velour-like coating of short, adjacently-disposed fibers affixed to and projecting from said shell on the side thereof adapted to face toward the interior of the vehicle such that when the finished headliner is installed in place in the vehicle, such coating serves as an interior finish thereof. While various velour-like fiber coatings of this type may be employed, most preferably the fibers are nylon fibers.

An especially desirable way of affixing the short fibers to the shell to form the velour-like coating is by use of a process comprising spraying the short fibers from a spray gun and utilizing an electric current applied to the nozzle of the sprayer to cause the fibers to align themselves so they project (stand up) from the desired surface of the shell. In this operation the shell is coated with a suitable quick setting adhesive such as an epoxy adhesive so that when the aligned fibers impinge upon the surface of the shell they become bonded thereto by the adhesive as it hardens. One such spraying process is known in the art as the SWADE-A-TRON process.

To produce the shells of this invention numerous conventional procedures can be used. For example, such known processes as injection molding, compression molding, thermoforming, vacuum forming and the like are suitable for use. All that is required is to form a unitary plastic body of appropriate shape and size by suitably positioning a core of substantially rigid wire mesh within a fluid, or at least suitably softened, plastic mass and keeping the core in such position as the plastic mass is hardening or being hardened into the unitary plastic body of the desired shape and size to fulfill the requirements of the particular vehicle for which the shell is designed. In such operation the molten or softened plastic is normally caused to envelop the pre-positioned wire mesh core, although it is possible to introduce the wire mesh into a pre-existing suitably sized and shaped mass of molten or softened plastic so that the wire mesh core becomes enveloped by the plastic.

The wire mesh should be flexible enough to be bent into the desired shape for the shell yet sufficiently rigid to hold its shape once it has been bent into the desired shape. Conventional wire mesh such as 14 mesh, as well as wire mesh commonly known as chicken wire can be used as the core material in the shells of this invention. The wire itself is preferably about 1/16 inch in diameter, and preferably the wires are arranged in a crisscross pattern wherein the wires of the network form symmetrical diamond shaped openings in the mesh which measure about ¼ to about ⅜ inch from one corner to the opposite corner.

A wide variety of plastics can be used to form the unitary body of the shell within which the wire mesh is embodied. The plastics may be thermosetting plastics or thermoplastic materials, and the plastics may be unreinforced or reinforced with fibers, platelets, powders, turnings, or other reinforcing fillers, and the reinforcing fillers may be used singly or in suitable combinations. Illustrative plastics for use in making the shell include such materials as rigid polyurethanes, epoxies, acrylics, unsaturated polyesters, polyethylene, polypropylene, polystyrene, ABS, polyvinyl chloride, and the like.

The wire mesh reinforced shell complete with plastic coating top and bottom will usually have a thickness in the range of about 3/16 to about ¼ inch. However thicker or thinner shells may be used whenever deemed suitable for the purposes at hand. The important thing is that the shell have sufficient rigidity to maintain its shape over a period of years and yet be flexible enough that the shell will give enough when being installed as to pass through the passenger door and to be maneuvered around or over the steering wheel, car seat backs, etc.

Any of a variety of standard adhesives may be used for fastening foam-backed fabric or films to the shell on the side that is to face toward the interior of the vehicle. Typical adhesives for this use include epoxy resin adhesives, nitrile-phenolic adhesives, phenol-epoxy resin adhesives, polyvinyl acetate emulsion adhesives, phenol-butyral adhesives, rubber-base adhesives, and the like. In lieu of such foam-backed coverings paint may be applied to the shell to serve as the interior finish. Plastic or like coverings such as oil cloth may be used without backing as the interior finish, if desired. Alternatively the shell may be installed without any interior covering of any kind. As noted above a preferred embodiment of this invention involves use of a velour-like interior finish for the headliner.

As those skilled in the art will readily appreciate, this invention is susceptible to considerable variation in its practice within the spirit and scope of the ensuing claims.

I claim:

1. A vehicle headliner which comprises (i) a substantially rigid vehicle headliner shell of the approximate size and contour of the underside of the roof of the vehicle, said shell comprising a core of substantially rigid wire mesh embedded in and tightly bonded to an essentially void-free unitary layer of a relatively rigid plastic material enveloping said wire mesh; and (ii) a coating of short, adjacently-disposed fibers affixed to and projecting from said shell on the side thereof adapted to face toward the interior of the vehicle such that when the finished headliner is installed in place in the vehicle, such coating serves as an interior finish thereof simulating a velour finish.

2. The article of claim 1 wherein the relatively rigid plastic material is a thermoset plastic material.

3. The article of claim 1 wherein the relatively rigid plastic material is a thermoset plastic material.

4. The article of claim 1 wherein at least a portion of an end or side of the wire mesh protrudes for a short beyond the end or side of the unitary layer of relatively rigid plastic material.

5. The article of claim 1 wherein the wire mesh is completely encased within the unitary layer of plastic material.

6. The article of claim 1 wherein the fibers of said coating are nylon fibers.

7. The article of claim 1 wherein at least a portion of an end or side of the wire mesh protrudes for a short beyond the end or side of the unitary layer of relatively rigid plastic material, and wherein the fibers of said coating are nylon fibers.

8. The article of claim 7 wherein the relatively rigid plastic material is a thermoset plastic material.

9. The article of claim 7 wherein the relatively rigid plastic material is a thermoset plastic material.

10. The article of claim 1 wherein the wire mesh is completely encased within the unitary layer of plastic material, and wherein the fibers of said coating are nylon fibers.

11. The article of claim 10 wherein the relatively rigid plastic material is a thermoset plastic material.

12. The article of claim 10 wherein the relatively rigid plastic material is a thermoset plastic material.

* * * * *

UNITED STATES PATENT AND TRADEMARK OFFICE
CERTIFICATE OF CORRECTION

PATENT NO. : 5,026,586

DATED : June 25, 1991

INVENTOR(S) : Thomas E. Tabor

It is certified that error appears in the above-identified patent and that said Letters Patent is hereby corrected as shown below:

Column 2, line 4, "set" should read -- sets --.

Column 2, line 22, "again" should read -- aging --.

Column 2, line 58, "tat" should read -- at --.

Column 2, line 66, "comprises" should read -- comprised --.

Column 4, line 52, "thermoset plastic" should read --thermoplastic--.

Column 5, line 2, "thermoset plastic" should read --thermoplastic--.

Column 6, line 6, "thermoset plastic" should read --thermoplastic--.

Signed and Sealed this

Fifth Day of January, 1993

Attest:

DOUGLAS B. COMER

Attesting Officer

Acting Commissioner of Patents and Trademarks